3,527,581
MICROEMULSIONS OF WATER IN HYDROCARBON FUEL FOR ENGINES

Darrell W. Brownawell, Scotch Plains, and Max L. Robbins, South Orange, N.J., assignors to Esso Research and Engineering Company, a corporation of Delaware
No Drawing. Continuation-in-part of application Ser. No. 305,859, Aug. 30, 1963. This application Oct. 17, 1966, Ser. No. 586,978
The portion of the term of the patent subsequent to Oct. 18, 1983, has been disclaimed
Int. Cl. C10l 1/22
U.S. Cl. 44—51                    9 Claims

ABSTRACT OF THE DISCLOSURE

A fuel composition that is capable of improving the operating efficiency of an internal combustion engine comprises a hydrocarbon fuel whose boiling range is within the limits of 70° to 600° F., such as gasoline, diesel fuel or jet fuel, in which 1 to 30 wt. percent of water has been dispersed as a microemulsion wherein the size of the droplets of water does not exceed about 400 A. The microemulsion is formed by using a surfactant that comprises a mixture of at least two components, one of which is predominantly hydrocarbon soluble and the other is predominantly water soluble and the surfactant mixture is so balanced that the interfacial tension between the hydrocarbon and water phases is at least substantially zero. The balanced surfactant mixture is exemplified by a mixture of a fatty acid, an alkyl phenol and an alkylene polyamine or an alkanolamine. It is also exemplified by a mixture of alkyl phenyl polyethoxy alkanols.

---

This application is a continuation-in-part of Ser. No. 305,859, filed Aug. 30, 1963, now U.S. Patent 3,279,901. This invention relates to the operation of an engine with an emulsified fuel, and to the emulsified fuel itself, wherein the fuel, e.g., gasoline or jet fuel, contains a microemulsion of 1 to 30 wt. percent water dispersed in the fuel in a droplet size of less than about 400 A., and preferably less than 100 A.

Mechanical water injection systems are used to increase the power output of engines. For example, it is customary to inject water into the combustion chamber of a jet airplane on takeoff with the result that the high heat of vaporization of the water cools the combustion chamber and allows more fuel to be burned without overheating. The larger quantity of fuel that is thereby burned provides additional thrust for the takeoff. The present invention is based upon the concept of microemulsifying the water directly in the fuel as opposed to mechanical injection of the water into the engine. The resulting microemulsified water will provide a number of advantages. For example, in jet engines it will provide for additional thrust upon takeoff while also reducing the carbon and smoke formation during cruising conditions. Also, the water will be more evenly distributed in the combustion chamber and thus provide greater cooling efficiency. Water emulsified into gasoline for use in automobile engines can reduce atmospheric pollution, since the mixture of gasoline and water will combust at a lower temperature than gasoline per se. As a result, the formation of nitrogen oxides, e.g., nitric oxide, a major exhaust gas air pollutant, is reduced. Also, there will be a reduction of hydrocarbon vapor losses from the fuel tank, thereby minimizing another major contributor to air pollution. In addition to the above advantages, the microemulsions of the present invention are considerably less flammable than gasoline or jet fuel per se and are therefore safer to transport and use. The flammability is reduced because the partial pressure of the jet fuel or gasoline is lowered, and also because the higher temperature of vaporization reduces the temperature of the burning mixture.

A main disadvantage to prior hydrocarbon-fuel emulsions is that they lacked sufficient storage stability. In the present invention, this disadvantage is overcome by dispersing or emulsifying the water in the gasoline or jet fuel in a very finely divided form, i.e., in the form of a microemulsion, so that the fuel and water will not separate during storage or use. In forming the microemulsions of the invention, the water phase is dispersed in the gasoline or jet fuel phase in small droplets by simple mixing in the presence of a surfactant or dispersant that is capable of lowering the interfacial tension between the two phases, hydrocarbon and water, to substantially zero. If there is a positive interfacial tension between the hydrocarbon and water phases, only macroemulsions can be formed. Macroemulsions do not possess satisfactory stability.

It is well known that the interfacial tension between hydrocarbon and water phases can be lowered by adding to the system one or more surfactants which concentrate at the interface between the two phases. In general a surfactant that is only water-soluble or only hydrocarbon-soluble will not lower the interfacial tension sufficiently to form a microemulsion. While in principle a single surfactant with the correct balance between water-solubility and hydrocarbon-solubility could form a satisfactory microemulsion, the amount of water that can be microemulsified in a hydrocarbon-continuous system is maximized if a blend of at least two surfactants is used, one of which is predominantly water-soluble and the other is predominantly hydrocarbon-soluble.

In accordance with the present invention, a balanced combination of surfactants is used so as to achieve a lowering of the interfacial tension between hydrocarbon and water phases to at least zero, whereby microemulsification of the water in the hydrocarbon fuel is achieved. At least two types of surfactants are used, one of which is predominantly hydrocarbon-soluble and only moderately water-soluble, referred to as Type A; the other being predominantly water-soluble and only moderately hydrocarbon-soluble, hereinafter generally referred to as Type B. Both types of surfactants have a hydrocarbon portion to impart solubility in, or affinity for, the hydrocarbon phase, e.g., gasoline or jet fuel, and a polar portion, e.g., a hydroxy, carboxy, amino, or similar group, to impart solubility in or affinity for the water phase. In general, the proportion of carbon atoms to polar groups will govern whether the surfactant is predominantly hydrocarbon-soluble or predominantly water-soluble.

Type A surfactants are exemplified by fatty acids of from 12 to 20 carbon atoms, and also by alkyl phenols having an alkyl group of 8 or more carbon atoms. Type B surfactants are exemplified by amino compounds selected from the group consisting of alkylene polyamines and alkanolamines and the salts of these amines with the fatty acids.

A particularly effective combination of surfactants for use in this invention comprises a mixture of a fatty acid, an alkyl phenol and an alkylene polyamine or an alkanol amine. Generally, this additive mixture will comprise these three components in relative amounts of 0.2 to about 2 parts of the amine compound per 1 part of the fatty acid and from about 0.1 to about 1.6 parts of the alkyl phenol per 1 part of fatty acid. Detailed consideration of these ratios appears hereinafter. Another effective combination comprises products of reaction of alkyl phenols with alkylene oxides.

The fatty acids suitable for this invention include those having from 12 to 20 carbon atoms. The acid can be saturated, for example, lauric, myristic, arachidic, palmitic or stearic acid or it can be unsaturated. The preferred acids are those which contain 1 to 3 double bonds, e.g., oleic, linoleic, or linolenic acid. Other suitable acids include palmitoleic, elaidic, eleostearic, licanic, hypogeic, ricinoleic, vaccenic, and punicic. While these acids may be substituted or unsubstituted, it is preferred that they be unsubstituted. Particularly suitable is a mixture of fatty acids from tall oil.

The amines that are effective include alkylene polyamines having 2 to 4 amino groups and from 1 to 3 carbons per amine group, e.g., diethylene triamine. Alkylene diamines such as ethylene diamine or propylene diamine are preferred.

Even more effective than the alkylene polyamines are certain amino alcohols and preferably mixtures of these amino alcohols. Suitable amino alcohols include primary, secondary and tertiary alkyl amino alcohols containing from 2 to 5 carbon atoms per alkyl group. Suitable amino alcohols include, for example, ethanolamine, pentanol amine, diethanol amine, 2-amino-2-methyl propanol-1, 2-amino-2-methyl butanol-1, etc. The preferred amino alcohols are the primary, secondary and tertiary isopropanol amines, to wit, monoisopropanol amine, diisopropanol amine, and triisopropanol amine. Economically, mixtures of isopropanol amines are particularly preferred.

The alkyl phenols used in conjunction with the amino compound and fatty acid in this invention include the monohydroxy and polyhydroxy phenols having an alkyl group containing from 8 to 12 carbon atoms. The alkyl group, saturated or unsaturated, can be branched or straight chained. The alkyl group and/or the aryl group can be substituted with halogen or the like but they are preferably unsubstituted. The presence of one to two additional alkyl groups containing from about 1 to 8 carbon atoms per group on the aryl group will not hinder the performance of a phenol so long as the phenol has at least one alkyl group containing from 8 through 12 carbon atoms. Thus, it is seen that the cresols, that is, the methyl phenols, can be used to synthesize the alkyl phenols of this invention. Examples of suitable alkyl phenols include octyl phenol, nonyl cresol, 1-propyl-3-dodecyl phenol, 1,3-dimethyl-5-decyl phenol, etc. Economically, a mixture prepared by alkylation of phenol with tripropylene and comprising about 60 to 70% mononony1 phenol and about 30 to 40% dinonyl phenol is preferred.

A second class of surfactants constituting both Type A and Type B emulsifiers are the alkyl phenyl polyethoxy alkanols obtained by reacting 1 to 16 molar proportions of ethylene oxide with one mole of an alkyl phenol having a $C_5$ to $C_{12}$ alkyl group. These materials can be either predominantly water-soluble or predominantly hydrocarbon-soluble or have balanced hydrocarbon solubility and water solubility, depending on the ratio of the ethylene oxide groups to the alkyl phenol molecule. These materials can be represented by the formula:

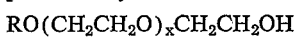

where R is the alkyl phenyl group and $x$ is zero to 15.

Examples include the reaction product of 6 moles of ethylene oxide with one mole of dodecyl phenol, the reaction product of 5 moles of propylene oxide and 4 moles of ethylene oxide with one mole of hexyl phenol, and the reaction product of 12 moles ethylene oxide with 1 mole of nonyl phenol.

Particularly effective for this invention is a mixture of a predominantly hydrocarbon-soluble alkyl phenyl polyalkoxy alkanol, e.g., octyl phenol treated with 1 to 5 moles of ethylene oxide, and a predominantly water-soluble alkyl phenyl polyalkoxy alkanol, e.g., octyl phenol reacted with 7 to 15 moles of ethylene oxide.

The hydrocarbon fuels that are employed to prepare the emulsions of the present invention include kerosene, aviation turbo jet fuels, diesel fuels, aviation gasoline, motor gasoline, and other engine fuels boiling within the range of about 70° to 600° F.

Gasoline is defined as a mixture of liquid hydrocarbons having an initial boiling point in the range of about 70 to 135° F. and a final boiling point in the range of about 250 to 450° F. Most usually gasolines are identified as either motor gasolines or aviation gasolines. Motor gasolines normally have boiling ranges between about 70° and 450° F., while aviation gasolines have narrower boiling ranges between about 100° and 330° F. Gasolines are composed of a mixture of various types of hydrocarbons, including aromatics, olefins, paraffins, isoparaffins, and naphthenes. Jet fuels generally have boiling ranges within the limits of about 150° to 600° F. Jet fuels are usually designated by the terms JP-3, JP-4, JP-5, or JP-6. JP-4 and JP-5 fuels are defined by U.S. military specification MIL-T5624-G. Aviation turbine fuels boiling in the range of 300° to 550° F. are defined by ASTM specification D-1655-59T. The following are the characteristics of a typical jet fuel:

JP–4 FUEL

Reed Vapor Pressure—2.20; API Gravity—53.5; Freezing Point—Max. —76° F.

ASTM D–86 Distillation ° F.

| | |
|---|---|
| 1BP—140 | 50%—326 |
| 10%—251 | 80%—383 |
| 20%—278 | 95%—445 |
| 30%—300 | EP—473 |

In general, it is desired, for the purpose of the present invention, to emulsify from about 1 to about 30 wt. percent of water in the hydrocarbon fuel. Preferably, 1 to 15 wt. percent of water will be microemulsified in the fuel. Usually from about 0.5 to 2 parts by weight of surfactant will be needed for the emulsification of 1 part by weight of water. From an economic standpoint, one would, of course, use as low a ratio of surfactant to water as is feasible. In most instances, the weight of surfactant in the emulsification system will be about equal to the weight of water being emulsified.

In the case of the surfactant system comprising a fatty acid, an amine and an alkyl phenol, the ratio of fatty acid to amine compound will range from about 0.2 to about 2 parts by weight of amine for each part by weight of fatty acid, or more preferably, from about 0.4 to about 1.2 parts of amine compound per part of fatty acid. When operating at the lower end of the preferred range, i.e., about 0.4 part of amine per part of fatty acid, the amount of alkyl phenol can range from about 0.1 to about 0.8 part of alkyl phenol per part of fatty acid. When operating at the upper end of the preferred range of amine to fatty acid, i.e., about 1.2 parts of amine per part of fatty acid, the amount of phenol can range from about 0.2 to about 1.4 parts of phenol per part of fatty acid. Generally, as the proportion of amine to fatty acid increases, the proportion of phenol to fatty acid must also be increased to give the proper balance between water-solubility and hydrocarbon-solubility. In the broader range of ratios of amine to fatty acid, i.e., from about 0.2 to about 2 parts of amine per part of fatty acid, the amount of phenol will range from about 0.1 to about 1.6 parts of phenol per part of fatty acid.

In the case of the surfactant system comprising alkylene oxide treated alkyl phenols, the surfactant or mixed surfactants of this type will be selected to have a ratio of ethylene oxide units to alkyl phenol units in the range of about 6 to 8.

The microemulsifying additive mixture may, in accordance with this invention, be employed in conjunction with a variety of other additives commonly used in fuels. Typical additives are rust inhibitors, corrosion inhibitors, antioxidants, dispersants, dyes, dye stabilizers, antistatic agents, and the like. It may be found to be convenient to prepare an additive concentrate for use in the various types of fuels and thus add all of the additives simultaneously.

In preparing the microemulsions it is usually most convenient to first mix the surfactants with the hydrocarbon fuel and then add the water to the resulting mixture with simple stirring.

The invention will be further understood by reference to the following tests and examples which include a preferred embodiment.

TEST SEQUENCE 1

Surfactant mixtures consisting of a fatty acid composition, an amino alcohol composition, and an alkyl phenol in relative amounts as shown in Table I were tested in a synthetic gasoline consisting of 50 volume percent isooctane and 50 volume percent toluene. The fatty acid composition was a commercial mixture comprising 8.0% conjugated linoleic acid, 36% non-conjugated linoleic acid, 50% oleic acid and 6% stearic acid. A mixture of isopropanol amines consisting of 15% monoisopropanol amine, 40% diisopropanol amine and 45% triisopropanol amine was employed. The alkyl phenol was a mixture of 65 wt. percent mononoyl phenol and 35 wt. percent dinonyl phenol hereinafter called nonyl phenol. Fifty grams of the combined additive mixture was added to 50 grams of the above-identified fuel. A series of tests were made, utilizing various weight ratios of the ingredients of the surfactant mixture. The mixture of fuel and surfactant fuel was titrated to the first appearance of water haze to determine the amount of water the system would take up as a microemulsion. Mixing was done by simple stirring at room temperature. The results appear in Table I.

TABLE I.—50 g. GASOLINE PLUS 50 g. SURFACTANT WATER ADDED TO FIRST HAZE

| Component weight ratios | | | |
|---|---|---|---|
| Mixed fatty acids | Mixed isopropanol amine | Nonyl phenol | Water to 1st haze, ml. |
| 1 | 1 | 1 | 57.0 |
| 1 | 1 | 2 | 6.5 |
| 5 | 5 | 1 | 26 |
| 1 | 1 | 5 | 2.6 |
| 5 | 5 | 2 | 35 |
| 5 | 2 | 1 | 52.0 |
| 5 | 2 | 2 | 19.4 |
| 5 | 2 | 5 | 3.3 |
| 5 | 2 | 10 | 2.0 |
| 5 | 2 | 25 | 4.8 |

It will be seen from the above test results that the efficiency with which the surfactant formed a microemulsion of water, i.e., the amount of water that could be incorporated as a microemulsion in the hydrocarbon fuel, varied as the proportion of fatty acid to amine compound to alkyl phenol was varied. The most effective ratios were in the range of from 0.4 to 1 part of amine and from 0.2 to 1 part of phenol per part of fatty acid.

TEST SEQUENCE 2

The same procedure was followed as described above in Test Sequence 1, except that the surfactant comprised various mixtures of ethylene oxide-treated octyl phenol having mole ratios of ethylene-oxide to octyl phenol in the range of from about 1 to about 13. Mixtures of pairs of these various surfactants were used in various proportions so as to change the average ratio of ethylene oxide to octyl phenol in the mixture. Titration with water to determine the amount of water each system would take up as a microemulsion was conducted in the same manner as in Test Sequence 1. The various surfactant mixtures tested and the results obtained are given in Table II. An additional test not given in the table was made with 50 grams of the gasoline and 25 grams of a mixture of 1 part by weight of Triton X–45 and 5 parts by weight of Triton X–114. This mixture had an average ratio of ethylene oxide to alkylene phenol to 7.1 and took up 48.0 ml. of water before haze appeared.

TABLE II.—50 g. GASOLINE PLUS 50 g. SURFACTANT
[Ethylene oxide treated octyl phenol—water added to first haze]

| Weight ratio of— | | Average ratio, ethylene oxide to alkyl phenol | Water to first haze, ml. |
|---|---|---|---|
| Trinton X–15 | Trinton X–114 | | |
| 1.0 | 0.0 | 1.0 | 0.0 |
| 1.0 | 0.4 | 1.9 | 1.3 |
| 1.0 | 0.7 | 3.1 | 1.5 |
| 1.0 | 2.0 | 5.3 | 2.0 |
| Trinton X–45 | Trinton X–114 | | |
| 1.0 | 2.5 | 6.8 | 48.0 |
| 1.0 | 3.3 | 6.9 | 51.7 |
| 1.0 | 5.0 | 7.1 | 73.5 |
| 1.0 | 10.0 | 7.3 | 38.7 |
| Trinton X–102 | Trinton X–114 | | |
| 1.0 | 10.0 | 8.0 | 27.8 |
| 1.0 | 5.0 | 8.3 | 25.0 |
| 1.0 | 2.5 | 9.0 | 22.0 |
| 1.0 | 1.5 | 9.6 | 21.4 |
| 1.0 | 1.25 | 9.8 | 20.7 |
| Trinton X–102 | Triton X–15 | | |
| 1.0 | 0.7 | 4.3 | 1.4 |
| 1.0 | 1.0 | 6.7 | 2.0 |
| 1.0 | 0.5 | 8.3 | 3.0 |
| 1.0 | 0.17 | 11.0 | 3.9 |

Approximate mole ratios of ethylene oxide to octyl phenol:

Triton:
X–15 _____ 1
X–45 _____ 5
X–102 _____ 12–13
X–114 _____ 7–8

It will be seen from Table II that the best results with this surfactant system were obtained when the average ratio of ethylene oxide to alkyl phenol was in the range of about 6.5 to about 7.5 and when the ratios of ethylene oxide to alkyl phenol for the two surfactants were close together, i.e., about 5 versus about 7 to 8.

EXAMPLE 1

A regular grade of gasoline is mixed with about 1.8 wt. percent of a mixture of tall oil fatty acids similar in nature to the mixture of acids described in Test Sequence 1, mixed isopropanolamines, and nonyl phenol, in a weight ratio of 1 to 1 to 1 for the three components. Two wt. percent of water based on this mixture is stirred into the mixture, thereby forming a microemulsion. The emulsified fuel is employed to operate an automobile engine. The formation of atmospheric pollutants is reduced as compared with operation of the same engine with the gasoline without the added water.

EXAMPLE 2

To a JP–4 jet fuel there is added about 9 wt. percent of a mixture of ethylene-oxide-treated octyl phenol surfactants; one surfactant having a ratio of ethylene oxide to phenol of about 5 and the other surfactant having an ethylene oxide to phenol ratio of about 8. The proportion of the two surfactants is one that gives an average ratio of ethylene oxide to alkyl phenol of 7.1. To this mixture there is stirred in 10 wt. percent of water based on the fuel. A clear microemulsion results. This emulsified fuel is placed in an auxiliary tank in an airplane having a turbo jet engine. The emulsified fuel is used to increase the thrust of the turbo jet engine during takeoff of the airplane.

In the emulsified fuels of this invention, generally the amount of water emulsified in gasoline will range from about 1 to 10 wt. percent, preferably about 1 to 6 wt. percent. In jet fuels somewhat higher percentages of water will be employed, e.g., from about 5 to 30 wt. percent and preferably from about 6 to 15 wt. percent.

It is not intended that this invention be limited to the

What is claimed is:

1. A method for improving the efficiency of operation of an internal combustion engine which comprises employing as the fuel for said engine a hydrocarbon fuel whose boiling range is within the limits of 70° to 600° F. emulsified with from 1 to 30 weight percent of water, based on said hydrocarbon, in the presence of surfactant, said water being dispersed in the form of a clear microemulsion wherein the size of the droplets of water does not exceed about 400 A., said surfactant having a balanced combination of hydrocarbon solubility and water solubility such that the interfacial tension between the hydrocarbon and water phases is at least substantially zero.

2. A fuel composition capable of improving the operating efficiency of an internal combustion engine which comprises a major proportion of a hydrocarbon fuel whose boiling range is within the limits of 70° to 600° F. from 1 to 30 weight percent of water based on said hydrocarbon fuel, and from 0.5 to 2 parts by weight of surfactant, based on said water, said water being dispersed in said fuel in the form of a clear microemulsion, said surfactant comprising a mixture of at least two components, one of which is predominantly hydrocarbon soluble and the other is predominantly water soluble, said surfactant mixture being so balanced that the interfacial tension between the hydrocarbon and water phases is at least substantially zero.

3. Composition as defined by claim 2 wherein the said water content is between about 1 and 15 weight percent.

4. Composition as defined by claim 2 wherein said surfactant comprises a mixture of (a) a fatty acid of from 12 to 20 carbon atoms, (b) an amine compound selected from the class consisting of alkylene polyamines having from 2 to 4 amino groups and from 1 to 3 carbon atoms per amino group and alkyl amino alcohols having from 2 to 5 carbon atoms per alkyl group, and (c) an alkyl phenol having at least one alkyl group of from 8 to 12 carbon atoms, there being from about 0.2 to 2 parts by weight of amine compound per part of fatty acid and from about 0.1 to 1.6 parts of alkyl phenol per part of fatty acid.

5. Composition as defined by claim 4 wherein there are used from about 0.4 to about 1.2 parts of amine per part of fatty acid.

6. Composition as defined by claim 2 wherein said surfactant comprises alkyl phenyl polyalkoxy alkanols having in the range of from 1 to 16 molar proportions of $C_2$ alkylene oxide per mole of $C_5$ to $C_{12}$ alkyl phenol.

7. Composition as defined by claim 6 wherein a mixture of alkyl phenyl polyalkoxy alkanols is used to give an average of about 6 to 8 moles of alkylene oxide per mole of alkyl phenol.

8. Composition as defined by claim 2 wherein the surfactant comprises a mixture of ethylene oxide-treated octyl phenol of about 5 moles of ethylene oxide per mole of octyl phenol and ethylene oxide treated octyl phenol of about 7 to 8 moles of ethylene oxide per mole of octyl phenol such as to give an average of from about 6.5 to 7.5 moles of ethylene oxide per mole of octyl phenol.

9. Composition as defined by claim 2 wherein said surfactant is a mixture of tall oil fatty acids, mixed isopropanol amines and nonyl phenol.

References Cited

UNITED STATES PATENTS

| | | |
|---|---|---|
| 2,213,477 | 9/1940 | Steindorff et al. |
| 2,522,447 | 9/1950 | Harris. |
| 2,873,182 | 1/1959 | Kosmin _____ 44—51 |
| 2,920,948 | 1/1960 | Weeks _____ 44—51 |
| 3,346,494 | 10/1967 | Robbins et al. _____ 44—51 |
| 3,279,901 | 10/1966 | Robbins et al. _____ 44—66 |

DANIEL E. WYMAN, Primary Examiner

Y. H. SMITH, Assistant Examiner